United States Patent
Mademann

(10) Patent No.: US 7,577,430 B2
(45) Date of Patent: Aug. 18, 2009

(54) METHOD FOR ASSIGNING A MOBILE COMMUNICATIONS TERMINAL TO A CORE NETWORK NODE

(75) Inventor: Frank Mademann, Berlin (DE)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 0 days.

(21) Appl. No.: 10/473,257

(22) PCT Filed: Mar. 21, 2002

(86) PCT No.: PCT/DE02/01077

§ 371 (c)(1),
(2), (4) Date: Sep. 29, 2003

(87) PCT Pub. No.: WO02/080603

PCT Pub. Date: Oct. 10, 2002

(65) Prior Publication Data

US 2004/0097216 A1    May 20, 2004

(30) Foreign Application Priority Data

Mar. 30, 2001    (DE) ................... 101 17 269

(51) Int. Cl.
*H04W 4/00*    (2009.01)
(52) U.S. Cl. ............... 455/432.1; 455/435.1; 455/445; 455/410; 370/328; 370/338; 370/352
(58) Field of Classification Search ......... 455/410–411, 455/432.1, 435.1, 445, 436–437, 450, 456.1; 370/329, 331, 338, 352, 401, 328
See application file for complete search history.

(56) References Cited

U.S. PATENT DOCUMENTS 5,375,251 A * 12/1994 Pfundstein .................. 455/551

(Continued)

FOREIGN PATENT DOCUMENTS

EP    0859531 A2    8/1998

(Continued)

OTHER PUBLICATIONS

"Turbo-charger technical report", 3rd Generation Partnership Project (3GPP); Technical Specification Group (TSG) CN; UMTS, TR 23.219 V 1.0.0, 1999.

(Continued)

*Primary Examiner*—Sharad Rampuria
(74) *Attorney, Agent, or Firm*—Laurence A. Greenberg; Werner H. Stemer; Ralph E. Locher

(57) ABSTRACT

The invention relates to assigning a mobile communications terminal having a temporary subscriber identity and/or an assigned routing parameter to a core network node of a core network provider when changing from a first to a second core network area. The invention includes coding a maximum of one core network node of the respective core network area with respect to the routing parameter and/or the temporary subscriber identity of the mobile communications terminal; assigning the mobile communications terminal to a core network node of the second core network area according to: assigning to the maximum of one core network node, which is coded with respect to the routing parameter and/or the temporary subscriber identity or; assigning to an alternative core network node if no core network node, which is coded with respect to the routing parameter and/or the temporary identity, does not exist in the second core network area.

19 Claims, 1 Drawing Sheet

U.S. PATENT DOCUMENTS

| | | | | |
|---|---|---|---|---|
| 5,590,398 | A | * | 12/1996 | Matthews .................. 455/433 |
| 5,675,628 | A | * | 10/1997 | Hokkanen .................. 455/433 |
| 5,777,560 | A | * | 7/1998 | Sakai et al. ................ 340/7.27 |
| 5,873,034 | A | * | 2/1999 | Alperovich et al. ...... 455/432.3 |
| 5,920,814 | A | * | 7/1999 | Sawyer et al. ............ 455/422.1 |
| 5,924,042 | A | * | 7/1999 | Sakamoto et al. ........... 455/458 |
| 6,002,932 | A | * | 12/1999 | Kingdon et al. ............ 455/433 |
| 6,006,094 | A | * | 12/1999 | Lee ............................ 455/445 |
| 6,039,624 | A | * | 3/2000 | Holmes ..................... 455/403 |
| 6,073,016 | A | * | 6/2000 | Hulthen et al. .......... 455/435.2 |
| 6,104,929 | A | * | 8/2000 | Josse et al. ................. 455/445 |
| 6,208,628 | B1 | | 3/2001 | Monrad et al. ............. 370/328 |
| 6,212,380 | B1 | * | 4/2001 | Laatu ....................... 455/436 |
| 6,275,706 | B1 | | 8/2001 | Rune ....................... 455/456.1 |
| 6,292,667 | B1 | * | 9/2001 | Wallentin et al. ........... 455/458 |
| 6,385,451 | B1 | * | 5/2002 | Kalliokulju et al. ......... 455/437 |
| 6,397,065 | B1 | * | 5/2002 | Huusko et al. .......... 455/435.2 |
| 6,577,874 | B1 | * | 6/2003 | Dailey ....................... 455/521 |
| 6,771,964 | B1 | * | 8/2004 | Einola et al. ................ 455/437 |
| 6,792,277 | B2 | * | 9/2004 | Rajaniemi et al. ........ 455/456.1 |
| 6,859,653 | B1 | * | 2/2005 | Ayoub et al. ............ 455/435.2 |
| 2001/0046218 | A1 | * | 11/2001 | Costa et al. .................. 370/331 |
| 2002/0025815 | A1 | * | 2/2002 | Rune et al. .................. 455/436 |
| 2002/0065081 | A1 | * | 5/2002 | Barany et al. ............... 455/450 |
| 2002/0068565 | A1 | * | 6/2002 | Purnadi et al. .............. 455/436 |
| 2003/0013443 | A1 | * | 1/2003 | Willars et al. ............... 455/432 |
| 2004/0017798 | A1 | * | 1/2004 | Hurtta et al. ................. 370/352 |
| 2004/0176091 | A1 | * | 9/2004 | Bajko et al. .............. 455/435.1 |

FOREIGN PATENT DOCUMENTS

| | | |
|---|---|---|
| WO | WO 00/21319 | 4/2000 |
| WO | WO 0021319 A1 * | 4/2000 |
| WO | WO 01/15471 A1 | 3/2001 |
| WO | WO 01/91370 A2 | 11/2001 |

OTHER PUBLICATIONS

Digital cellular telecommunications system (Phase 2+)(GSM); Universal Mobile Telecommunications System (UMTS); Intra-domain connection of Radio Access Network (RAN) nodes to multiple Core Network (CN) nodes (3GPP TS 23.228 version 5.2.0 Release 5) ETSI TS 123 236 V5.2.0 (Mar. 2002).

* cited by examiner

METHOD FOR ASSIGNING A MOBILE COMMUNICATIONS TERMINAL TO A CORE NETWORK NODE

CLAIM FOR PRIORITY

This application claims priority to International Application No. PCT/DE02/01077 as published in the German language on Oct. 10, 2002.

TECHNICAL FIELD OF THE INVENTION

The present invention relates to a method for assigning a mobile communications terminal having a temporary subscriber identity and an associated routing parameter to a core network node of a core network provider in the second core network area when changing from a first core network area to a second core network area.

BACKGROUND OF THE INVENTION

In the previous GSM and UMTS system, precisely one core network node is rigidly assigned to an identifiable radio area, i.e. to a location or routing area. In 3GPP, too, a method is specified in which a special routing parameter is assigned to each terminal during the new registration in a core network area which is covered by different core network nodes. In this arrangement, the mobile communications terminal must detect a change of core network area and indicate this to the network. In most cases, this routing parameter is also coded in parallel in the temporary subscriber identity (P-)TMSI and identifies exactly one core network node within a core network area. Such a core network area consists of a number of identifiable radio areas. If the terminal changes the identifiable radio areas but remains within such a core network area, the core network node is not changed. This distribution of terminals to corresponding core network nodes enlarges the total radio area covered by a single core network node. This reduces the signaling load, particularly that with the home location register. Availability is increased by a number of nodes which are operated in parallel. This improves the reliability. In addition, the scalability of the overall system is improved. Moreover, the number of handovers between the core network nodes is reduced. So that it is always the same core network node which serves the terminal within a core network area, the radio system sets up the signaling link for a terminal with the respective core network node in accordance with the routing parameter assigned. If a core network area is changed, the terminal informs the radio system that it is new in this core network area. The terminal recognizes this from the identities of the identifiable radio areas which are provided with a special structure for this purpose. In the case of such a change of the core network area, the radio system selects a new core network node which is to serve the terminal from then on, for example, by a load distribution between the possible core network nodes. The new core network node usually provides the mobile communications terminals with a new routing parameter and a new temporary subscriber identity. These are stored by the mobile communications terminal and sent to the network again during subsequent signaling.

SUMMARY OF THE INVENTION

One embodiment of the invention is to provide a method in which it is possible to support and/or to distinguish core network nodes of different core network providers in a radio system.

According to an embodiment of the invention, a method for assigning a mobile communications terminal having a temporary subscriber identity and/or an associated routing parameter to a core network node of a core network provider when changing from a first core network area to a second core network area is provided. The method according to this embodiment includes:

a. coding of a maximum of, in each case, one core network node of the respective core network area in the routing parameter and/or the temporary subscriber identity of the mobile communications terminal, b. assigning the mobile communications terminal to a core network node of the second core network area in accordance with the following prioritization:
   to the, at most, one core network node of the second core network area which is coded in the routing parameter and/or the temporary subscriber identity, or
   to an alternative core network node if, in the second core network area, there is no core network node coded in the routing parameter and/or the temporary subscriber identity.

If a core network node within the second core network area corresponds to the routing parameter, i.e. if it is coded in the routing parameter, the mobile communications terminal may be assigned to this in first priority independently of whether the routing parameter has been assigned in the current core network area of the mobile communications terminal or in another one. The routing parameter can also be stored within the temporary subscriber identity.

According to another embodiment of the invention, the mobile communications terminal is, in each case, preferably assigned to a core network node of the same core network provider when changing from a first core network area to a second core network area. The coding of the routing parameters for each core network node also preferably contains the respective core network provider. Thus, the coding provides an identifiability of the core network provider and, at the same time, of the corresponding core network nodes of the core network provider. The method according to this embodiment thus has the result in first priority that a mobile communications terminal is again assigned to a core network node of the same core network operator when changing the core network area. In each core network area, at the most, one core network node of a core network provider exists which exactly corresponds to the coding in the routing parameter and/or in the temporary subscriber identity. The coding in the routing parameter and/or the temporary subscriber identity shows which core network provider and/or which code network has hitherto served the mobile communications terminal. Accordingly, the signaling of the mobile communications terminal is transmitted to a core network node of the same core network provider and/or of the same core network, as far as possible, even after changing the core network area. If no core network node is set up in the new, i.e. second core network area for a particular coding, i.e. for an actual routing parameter of the first core network area, the mobile communications terminal will be assigned to another or an alternative core network node. Here, too, the assignment is preferably to a core network node of the same core network provider.

For this purpose, accompanying parameters, such as temporary subscriber identity and/or routing parameters, are evaluated to derive an alternative core network of the same core network provider within the new core network area from the known structure.

In the assignment to an alternative core network node in the case where there is no core network node corresponding to the routing parameter in the new core network area, the possibility of controllable distribution of roaming subscribers is given which, for example, comes from foreign networks, between the core network providers which are using a common radio system. The distribution between the core network providers can take place, for example, by lists which, for example, contain preferred or otherwise unwanted other core network providers and are stored in the individual core network nodes. Correspondingly, mobile communication terminals which newly arrive in a core network are accepted or rejected by a core network node. In the case of a rejection, the signaling of this mobile communication terminal is set to a core network node of another core network provider. If the core network provider himself operates a number of networks nationally and/or internationally, the lists can also comprise the multiplicity of corresponding network identifiers of the individual networks operated by this core network provider. As a result, a mobile communications terminal will always be assigned to a core network node of a core network of the same core network provider even in the case of international roaming.

According to another embodiment of the invention, during assignment to an alternative core network node in step b of the abovementioned method, a new routing parameter and/or a new temporary subscriber identity is preferably assigned to the mobile communications terminal if no core network node of the new core network carrier corresponds to the original routing parameter and/or to the temporary subscriber identity. The choice of an alternative core network node preferably takes place in accordance with a suitable load distribution.

Furthermore, the assignment in step b is preferably performed in a functional unit of a radio system which serves various core networks. This is preferably done in the base station controller (BSC) in GSM radio (GERAN) and in the radio network controller (RNC) in the case of UTRAN. The corresponding functional unit of the radio system has a table which assigns a signaling address to each routing parameter. The information to be evaluated with respect to the assignment to a signaling address has hitherto been transparent for the radio system.

The method according to an embodiment of the invention can be preferably used both in mobile communications terminals of 3GPP from Re15 onward and also in terminals which correspond to previous radio systems such as UTRAN before Re15 or the GSM radio system. In the latter case, no explicit routing parameter is introduced but the core network node is preferably coded within the temporary subscriber identity. The temporary subscriber identity is thus no longer transparent for the radio system. This must be filtered out of the signaling messages by the radio system in order to determine the identity of the core network node and forward the signaling to a corresponding signaling address.

The coding of the core network node and/or of the core network provider in the temporary subscriber identity is preferably also used if a routing parameter is not used in alternative radio systems such as, for example, GSMRAN/GERAN. Thus, however, it is possible to retain the core network provider and/or also the core network node even during a change between alternative radio systems (GSMRAN/GERAN and UTRAN). This reduces the signaling load, especially that with the home location register. Furthermore, the number of handovers between core network nodes is reduced.

According to another embodiment of the invention, the mobile communications terminal is preferably assigned to an alternative core network node when changing from a first core network area to a second immediately adjacent core network area since the coding in step a of the method is performed in such a manner that there is no core network node coded in the routing parameter and/or the temporary subscriber identity in the second immediately adjacent core network area. This appropriate configuring of the routing parameter values, which are used within a core network area, makes it possible to achieve a new distribution by the radio system with almost every change of core network area without the mobile communications terminal or the radio system having to detect a change of core network area. For this purpose, the same values for the routing parameters are never configured in each case in two adjacent core network areas. This means that in each case, two adjacent core network areas together, one actual routing parameter, i.e. one actually coded routing parameter, can only be assigned to one core network node.

In the most frequent changes, namely those between adjacent core network areas, this enables the mobile communications terminals to be distributed between the responsible core network nodes of one and the same core network provider, for example in accordance with a uniform load distribution.

Compared with the 3GPP approach, a reduction of the possible location and/or routing areas is prevented and, as a result, also a reduction in the possible number of temporary subscriber identities. This is because location as well as routing area identities do not need to be structured.

According to an embodiment of the invention, it is possible to code a core network provider in a temporary subscriber identity and/or a routing parameter and distribute or, respectively, route signaling messages from mobile communications terminals through a radio system to core network nodes in accordance with this coding. Furthermore, a configuration of mutually exclusive values for routing parameters which can also be coded in the temporary subscriber identity in each case two adjacent core network areas provides that the radio system can assign the mobile communications terminal of any new core network node of the same core network provider during a change of the core network area since no core network node is configured in the new core network area for the old value of the routing parameter but, at the same time, the core network operator can be derived from the old value and/or the old coding of the routing parameter. The selection can thus take place completely by load distribution between the core network nodes of the core network provider since the original routing parameter cannot be taken into consideration.

BRIEF DESCRIPTION OF THE DRAWINGS

Exemplary embodiments of the invention are explained below with reference to the appended drawings, in which.

DETAILED DESCRIPTION OF THE PREFERRED EMBODIMENTS

Figure 1:
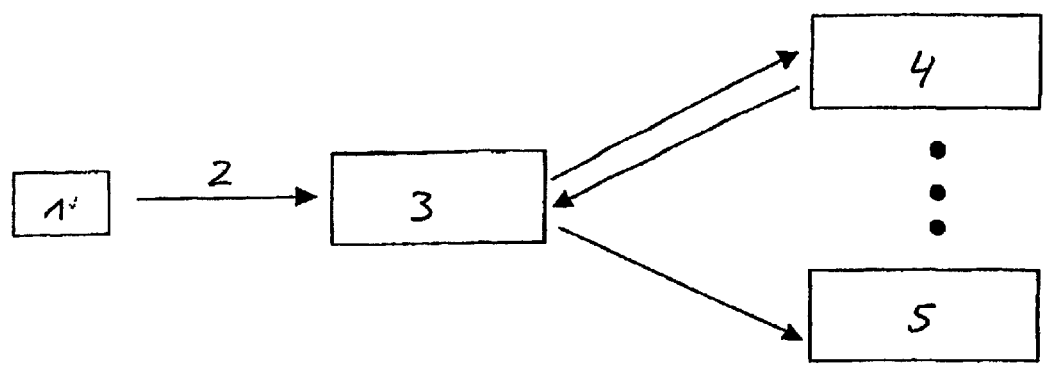
FIG. 1 shows a diagrammatic representation of the assignment of a mobile communications terminal to a core network node when the temporary subscriber identity and/or the associated routing parameter cannot be assigned to any core network node in a core network area.

A mobile communications terminal or a corresponding mobile station 1 (MS), when entering into a core network area, sets up a radio signaling channel 2 and sends an initial signaling message. In a functional unit 3 of a radio system, it is determined from a temporary subscriber identity associated with the mobile communications terminal 1 and/or a correspondingly associated routing parameter that MS 1 has not yet been assigned to a core network node in this core network area. The functional unit 3 of the radio system can be a UTRAN-RNC (UMTS Terrestrial Radio Access Network—Radio Network Controller) or a GERAN-BSC (GSM Enhanced Radio Access Network—Base Station Controller). The functional unit 3 recognizes from the coding stored in the routing parameter and/or in the temporary subscriber identity that there is no core network node corresponding to this stored coding in the core network area. In the 3GPP approach, the mobile communications terminal 1 itself recognizes the change into another core network area from a structure of the radio area identities, but this is ignored by the functional unit 3 of the radio system. In this case, in which no core network node is configured for the original value of the routing parameter, the functional unit 3 selects an alternative core network node. The choice is preferably made by taking into consideration a load distribution. In a preferred embodiment of the invention, the parameters stored in the routing parameter and/or the temporary subscriber identity are evaluated as a result of which, if necessary, a core network node of a possible core network provider can be derived from the structure. The functional unit 3 of the radio system then sends the initial signaling message to the core network node 4 found by the functional unit 3 of the radio system. The core network node 4 first determines the subscriber data. Furthermore, the home network of the mobile communications terminal 1, known from the subscriber data, is compared with stored lists of preferred or unwanted networks in the core network node 4. If the core network node 4 accepts the mobile communications terminal 1, any subsequent signaling is exchanged between this core network node 4 and the mobile communications terminal 1. If, in contrast, the mobile communications terminal 1 is not wanted, if, for example, it is from an international network which also belongs to another network provider who, for example, shares the radio system, the core network node 4 projects the signaling message to the functional unit 3 of the radio system with a corresponding reason. The reason can indicate that the international network from which the mobile communications terminal 1 comes does not belong to the preferred networks listed in the list stored in the core network node 4. The functional unit 3 of the radio system determines, with the aid of the said reason, an alternative core network node of another core network provider which is also served by the radio system. If such a core network node 5 is found, the functional unit 3 of the radio system sends the signaling message to this core network node 5. The core network node 5, in turn, determines the subscriber data of the mobile communications terminal 1 and confirms the assignment to this core network node 5. Any subsequent signaling is now exchanged between the core network node 5 and the mobile communications terminal 1. The mobile communications terminal 1 receives a new temporary subscriber identity and/or a new routing parameter in which exactly the core network node 5 in this core network area is coded from now on.

Figure 2:
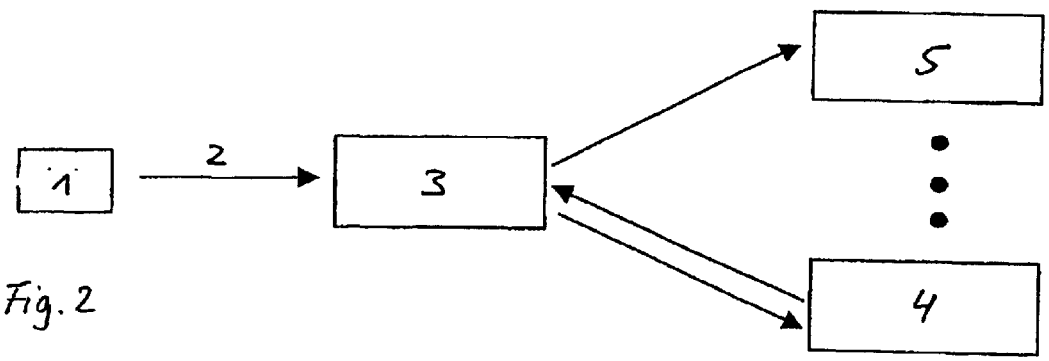
FIG. 2 shows a diagrammatic representation of the assignment of a mobile communications terminal to a core network node when the temporary subscriber identity and/or the routing parameter contains coding which is known in the core network area.

FIG. 2 shows a diagrammatic representation of the assignment of a mobile communications terminal 1 to a core network node if there is a value present within the temporary subscriber identity and/or in the routing parameter for which a core network node is configured in the core network area. The mobile communications terminal or the corresponding mobile station 1 (MS), respectively, sets up a radio signaling channel 2 and sends an initial core network signaling message to a functional unit 3 in a corresponding radio system. In the functional unit 3 of the radio system, it is determined from the temporary subscriber identity and/or from the correspondingly assigned routing parameter associated with the mobile communications terminal 1 that the mobile communications terminal can be assigned to a core network node from the core network area. Following this, the functional unit 3 of the radio system sends the initial signaling message to the core network node 4 determined by the functional unit 3. After the core network node 4 has verified the data contained in the message and established that the mobile communications terminal 1 is registered in the core network node 4, it confirms the signaling. Any subsequent signaling is exchanged between the mobile communications terminal or, respectively, between the mobile station 1 and the core network node 4. If, however, the core network node 4 finds that the mobile communications terminal 4 is not registered, the core network node determines the subscriber data. This case may occur if the mobile communications terminal 1 is newly arriving in this core network area and has been distributed to this core network node by old parameters. Using the old parameters can lead to a desired assignment to a core network node, but not necessarily so. A functional unit within the core network node 4 compares the home network of the mobile communications terminal 1, known from the subscriber data, with lists of preferred or unwanted networks stored in the core network node 4. If the mobile communications terminal 1 is, for example, from another international network which belongs to another operator who shares the radio system, the core network node 4 rejects this signaling to the functional unit 3 of the radio system with corresponding reasons. Following this, the functional unit 3 determines a core network node of another core network provider. The functional unit 3 of the radio system sends the signaling to a corresponding core network node 5 which confirms the assignment. Any subsequent signaling is exchanged between the core network node 5 and the mobile communications terminal 1. The mobile communications terminal 1 receives a new temporary identity and/or a new routing parameter in which the core network node 5 is then correspondingly coded. From now on, the signaling of the mobile communications terminal 1 is automatically conducted to the core network node 5 as long as the mobile communications terminal 1 is located in this core network area.

The invention claimed is:

1. A method for assigning a mobile communications terminal having a temporary subscriber identity and/or an associated routing parameter to a core network node of a core network provider when changing from a first core network area to a second core network area, the mobile communications terminal having a corresponding radio system that includes a functional unit, comprising:

coding of a maximum of, in each case, one core network node of the respective core network area in the routing parameter and/or the temporary subscriber identity of the mobile communications terminal;

assigning, by the functional unit, the mobile communications terminal to a core network node of the second core network area, first to the, at most, one core network node of the second core network area which is coded in the routing parameter and/or the temporary subscriber identity, or second to an alternative core network node if, in the second core network area, there is no core network node coded in the routing parameter and/or the temporary subscriber identity, wherein assignment of the mobile communications terminal to the alternative core network is made when the mobile communications terminal is not from a home network of the core network provider.

2. The method as claimed in claim 1, wherein the mobile communications terminal is assigned to a core network node of the same core network provider when changing from a first core network area to a second core network area.

3. The method as claimed in claim 1, wherein the core network provider is coded in the routing parameter and/or the temporary subscriber identity.

4. The method as claimed in claim 1, wherein when the mobile communications terminal is assigned to an alternative core network node, the assignment takes place according to lists stored in the respective core network nodes.

5. The method as claimed in claim 1, wherein when it is assigned to an alternative core network node, a new routing parameter and/or a new temporary subscriber identity is assigned to the mobile communications terminal.

6. The method as claimed in claim 1, wherein the mobile communications terminal is assigned to a core network node of the second core network area in a functional unit of a radio system which serves a number of core networks.

7. The method as claimed in claim 1, wherein when changing from a first core network area to a second immediately adjacent core network area, the mobile communications terminal is assigned to an alternative core network node since the coding of a maximum of one core network node of the respective core networked area is performed in such a manner that there is no core network node coded in the routing parameter and/or the temporary subscriber identity in the second immediately adjacent core network area.

8. The method as claimed in claim 1, wherein assignment of the mobile communications terminal to the alternative core network is made based on a comparison of a home network of the mobile communications terminal, known from subscriber data, and lists of preferred or unwanted networks.

9. The method as claimed in claim 1, wherein assignment of the mobile communications terminal to the alternative core network is made based on load distribution.

10. A system comprising:
   a mobile communications terminal having a temporary subscriber identity and/or an associated routing parameter;
   a functional unit of a radio system corresponding to the mobile communications terminal, and
   a core network node of a core network provider, wherein the mobile communications terminal is assigned to the core network node when changing from a first core network area to a second core network area by
   coding of a maximum of, in each case, one core network node of the respective core network area in the routing parameter and/or the temporary subscriber identity of the mobile communications terminal, and
   assigning, by the functional unit, the mobile communications terminal to a core network node of the second core network area, first to the, at most, one core network node of the second core network area which is coded in the routing parameter and/or the temporary subscriber identity, or second to an alternative core network node if, in the second core network area, there is no core network node coded in the routing parameter and/or the temporary subscriber identity, wherein assignment of the mobile communications terminal to the alternative core network is made when the mobile communications terminal is not from a home network of the core network provider.

11. The method as claimed in claim 1, wherein the functional unit does not select the alternative core network node if it shares the radio system with the core network node.

12. The method as claimed in claim 1, wherein the functional unit serves multiple core networks.

13. The system as claimed in claim 10, wherein the functional unit serves multiple core networks.

14. The method as claimed in claim 1, wherein the functional unit is part of a base station.

15. The method as claimed in claim 1, wherein the functional unit is a UMTS controller.

16. The method as claimed in claim 1, wherein the functional unit is a GSM controller.

17. The system as claimed in claim 10, wherein the functional unit is part of a base station.

18. The system as claimed in claim 10, wherein the functional unit is a UMTS controller.

19. The system as claimed in claim 10, wherein the functional unit is a GSM controller.

* * * * *